Patented May 2, 1939

2,156,792

UNITED STATES PATENT OFFICE 2,156,792

PREPARATION OF DERIVATIVES OF N-PHENYL-ARYLAMINES

Arthur M. Neal and George C. Strouse, Wilmington, Del., assignors to E. I. du Pont de Nemours & Company, Wilmington, Del., a corporation of Delaware No Drawing. Application July 25, 1936, Serial No. 92,604

18 Claims. (Cl. 260—571)

This invention relates to new compositions of matter and methods of making the same, and more particularly to a new method of making certain derivatives, such as hydroxy and amino substituted derivatives, of diphenylamine.

Some of these derivatives are very valuable as intermediates for use in the manufacture of sulfur colors, while others find importance either as antioxidants for use in rubber, or as intermediates in the preparation of rubber antioxidants.

There are several methods for making some of these compounds, which methods are disclosed in the literature. Of these, the most common is that of Calm, Ber. 16, 2799 for the preparation of p(OH) diphenylamine from an excess of aniline with hydroquinone using large amounts of calcium chloride as a condensing medium. Some of these derivatives, for example, 4-4'-di(OH) diphenylamine, can be made by way of the indophenol with subsequent reduction to the leuco body. Methods for this type of synthesis are given in "Die Schwefelfarbstoffe ihre Herstellung und Verwendung" by Ottor Lange published by Otto Spamer in Leipzig in 1912.

An object of this invention is to provide a new method for producing hydroxy and amino substituted derivatives of diphenylamine. Other objects are to provide new compositions of matter and to advance the art. Still other objects will appear hereinafter.

These objects may be accomplished by condensing a dihydroxy substituted aromatic hydrocarbon of the benzene series with an aromatic amine, employing small amounts of a catalytic chloride of a polyvalent metal such as zinc chloride, aluminum chloride, and ferric chloride as a catalyst. The reactions may be represented by the following equations:

(1) 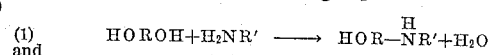
and
(2) 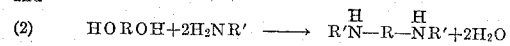

in which R represents an aromatic hydrocarbon radical of the benzene series, and R' represents an aromatic group of the benzene and naphthalene series.

The zinc chloride appears to be the most efficient catalyst for carrying out the reaction of Equation 1 and the aluminum chloride for the reaction of Equation 2.

By the term "an aromatic hydrocarbon of the benzene series" or "an aromatic hydrocarbon radical of the benzene series" we mean benzene or a benzene radical, either unsubstituted or substituted by aliphatic hydrocarbon radicals such as alkyl and unsaturated aliphatic hydrocarbon radicals. By the term "an aromatic group of the benzene and naphthalene series" we intend to include not only unsubstituted benzene and naphthalene radicals, but also substituted radicals in which the substituents may be alkyl, aralkyl, alkoxy, hydroxy, amino, mercapto, halogen, hydrogen, and like groups.

By the terms "lower alkyl" and "lower alkoxy" as employed herein and in the claims, we mean alkyl and alkoxy groups containing up to and including 7 carbon atoms.

The preparations are carried out by heating an intimate mixture of the amine, the hydroxy compound, and the catalyst, to temperatures preferably between 170–280° C., in an apparatus equipped with an agitator, a reflux column, and a take-off condenser. The temperature of the reflux column is regulated so that the water formed in the reaction passes off as a vapor and is condensed in the take-off condenser, while the amine or hydroxy body, if volatile at the temperature of reaction, is condensed and returned to the reaction vessel. The progress of the reaction may be followed by collecting and measuring the water split off during the reaction. In practice, it is sometimes advisable to modify the procedure slightly by adding the amine first and heating to approximately 100° C. before adding the hydroxy compound and the catalyst. This latter method simplifies the problem of assuring agitation and preventing local overheating in the early stages of the reaction.

In general, it is desirable to use substantially theoretical amounts of amine and of hydroxy compound. In certain cases, particularly in the case of the more volatile amines, it has been found advisable to employ a slight excess of the amine to compensate for any loss of amine due to volatilization with the water being split out. In other cases, it will be advisable to use a slight excess of the hydroxy compound in order to minimize the formation of the reaction product involving two moles of amine and one mole of hydroxy compound. By the term "substantially theoretical amounts", we intend to include within the scope thereof the slight excesses (constituting a small fraction of a mole) above referred to.

The catalyst should preferably be employed in an amount of about 0.5% to about 3.5% based on the total amount of amine and hydroxy body employed, although slightly larger amounts may be used in certain cases.

In order to more clearly illustrate our invention, the preferred modes of carrying the same into effect, and the advantageous results to be obtained thereby, the following examples are given:

*Example I*

116.4 parts of aniline were placed in a suitable vessel equipped with an agitator and heated to 100° C. 100 parts of hydroquinone were added with agitation followed by 1.75 parts of anhydrous aluminum chloride. The mixture was heated to 180° C. during the course of about 2 hrs. The temperature was held at 180° C. as long as water was distilling out of the reaction mixture. As the evolution of water slackened, the reaction temperature was raised gradually to 215° C. The rate of heating is so regulated that the aniline distilling out of the charge is condensed in the upright condenser while the water vapor passes off and is condensed in the take-off condenser. The water distilling off is collected and weighed. 19 parts of water are collected in a total heating time of 13 hrs.

The molten charge is then blown into a drowning mixture of 45 parts of sodium hydroxide and 40 parts of sodium sulfide crystals dissolved in 500 parts of water. The drowned charge is heated to 75-85° C. with agitation and maintained at this temperature for 1 hr. It is then filtered. The filter cake is N-N'-diphenyl-p-phenylene diamine. The filtrate is cooled to 15° C. and p(OH) diphenylamine precipitated by the addition of 35% sulfuric acid. The charge is acidified until just acid to Congo red. The p(OH) diphenylamine can then be filtered off, washed free of acid and dried. The yield of p(OH) diphenylamine is about 60 to 70% of theory based on the hydroquinone.

*Example II*

This experiment was identical with Example I, except that 2 parts of ferric chloride was used at a catalyst in place of 1.75 parts of aluminum chloride.

*Example III*

100 parts of p-phenetidine were put into a suitable vessel similar to that used in Example I and heated to 100° C. 80 parts of hydroquinone were added, followed by 3 parts of zinc chloride. This mixture was heated to 210°-215° C. during 2 hours and held at that temperature for another 2 hrs. or until the reaction was complete.

While the charge was being heated at 210-215° C. a solution of 730 parts of water, 29 parts of 100° sodium hydroxide (as 30% solution) and 10 parts of sodium sulfhydrate 100% (as 35% solution) was prepared in another vessel. As soon as the period of heating at 210-215° C. was finished, the molten charge was transferred to the alkaline sulfide solution with good agitation. This mixture was heated to 75° C. and stirred for 1 hr. Then the solution was filtered to remove the N-N'-di-p-phenetyl-p-phenylene diamine as an insoluble residue. This residue was washed with 365 parts of hot (70° C.) water containing 4 parts of sodium hydroxide 100% and 5.5 parts of sodium sulfhydrate 100%. Finally the residue was washed with about 100 parts of water.

The filtrate and washings were collected in a vessel and cooled to 30° C. p-Hydroxy-p'-ethoxy diphenylamine was then precipitated from the solution by adding 30% sulfuric acid until the liquid was neutral to thymolphthalein test paper and alkaline to phenolphthalein.

This precipitated p(OH)-p-ethoxy diphenylamine was filtered and washed with a solution of 15 parts of sodium bisulfite in 185 parts of cold water until the washings were no longer alkaline to Brilliant Yellow test paper. It was then washed with cold water to remove the bisulfite. It may be dried in a vacuum oven at 60° C. The dry material prepared in this way melted at about 83-87° C. and constituted a yield of about 60 to 70% of theory based on the hydroquinone. The purpose of washing the press-cake with bisulfite solution is to prevent oxidation of the p-hydroxy-p'-ethoxy diphenylamine when exposed to the air.

*Example IV*

44 parts hydroquinone, 80 parts aniline and 1.6 parts of aluminum chloride were charged into a pot equipped with an agitator and a refluxing column, which could be held at a temperature of 105-115° C. A take-off condenser was attached to the top of the refluxing column. The charge was heated to 190-195° C. with agitation at which point water began to be split out and distill over. The water distilling out was collected and weighed. Any aniline distilling out was separated and returned to the charge. As water was split out and collected, the temperature of the reaction mass was varied slowly. The rate of heating corresponding in general to the following schedule.

| Parts water recovered | Liquid temp. |
|---|---|
| | ° C. |
| 1.2 | 190 |
| 3.6 | 200 |
| 5.8 | 210 |
| 7.6 | 220 |
| 9.6 | 230 |
| 11.6 | 240 |
| 12 | 250 |
| 12.8 | 260 |
| 13.6 | 270 |
| 14.4 | 280 |

After 14.4 parts of water had been obtained and the temperature had reached 280° C., the reflux condenser was by-passed and any remaining aniline was distilled out. 5.6 parts of aniline were recovered in this manner. The total heating time for the preparation was 24-30 hrs. The charge was then cooled to 150° C. and cast into a cooling pan. The product is essentially pure N-N'-diphenyl-p-phenylene diamine containing less than 5% of p(OH) diphenylamine. The yield of diamine is approximately 90% of theory based on the hydroquinone.

*Example V*

The charge was identical with that in Example IV. In this case, when the temperature reached 250° C., the system was placed under reduced pressure and the last of the water together with the excess aniline was removed under reduced pressure without raising the temperature of the charge above 250° C. When carried out in this manner, the final conditions were a temperature of 250° C. and a pressure of 25 mm. Under these conditions, danger to the composition due to overheating is decreased and a purer product is obtained, the yield of diamine being approximately 95% of theory. The time cycle for carrying out the preparation is likewise reduced approximately 25%.

Example VI 123 parts of p-anisidine were charged into a suitable pot equipped with an agitator, reflux column and take-off condenser as in Example I. The p-anisidine was heated to 100° C. and 110 ing many other similar types of compounds. The intermediates and the catalyst used, as well as the compounds prepared, are given in the following table. In each case, one mole of the hydroxy substituted compound is used as the basic intermediate.

Table I

| Hydroxy body | Amine | Catalyst | Principle product prepared |
| --- | --- | --- | --- |
| Hydroquinone | p-Toluidine | Ferric chloride | p-Methyl-p'-(OH)-diphenylamine. |
| Do | p-Toluidine (2 moles) | do | N-N'-di-p-tolyl-p-phenylene diamine. |
| Do | o-Anisidine | Aluminum chloride | o-Methoxy-p'-(OH)-diphenylamine. |
| Do | o-Toluidine | do | o-Methyl-p'-(OH)-diphenylamine. |
| Resorcinol | Aniline | Ferric chloride | m-(OH)-diphenylamine. |
| Do | Aniline (2 moles) | do | N-N'-diphenyl-m-phenylene diamine. |
| Do | p-Phenetidine | do | p-Ethoxy-m'-(OH)-diphenylamine. |
| Do | p-Anisidine | do | p-Methoxy-m'-(OH)-diphenylamine. |
| Do | p-Toluidine (2 moles) | do | N-N'-di-p-tolyl-m-phenylene diamine. |
| Do | o-Toluidine | Aluminum chloride | o-Methyl-m'-(OH)-diphenylamine. |
| Catechol | Aniline | Ferric chloride | o-Hydroxy-diphenylamine. |
| Hydroquinone | o-Phenetidine | Zinc chloride | o-Ethoxy-p'-(OH)-diphenylamine. |
| Do | p-(b-Ethoxy-ethoxy) aniline | do | p-(b-Ethoxy-ethoxy)-p'-(OH)-diphenylamine. |
| Do | Phenoxy aniline | do | p-Phenoxy-p'-(OH)-diphenylamine. |
| Do | p-Thio-phenetidine | do | p-Ethyl-mercapto-p'-(OH) diphenylamine. | parts of hydroquinone and 5.3 parts of ZnCl₂ was added. The pot was then closed and heated with agitation to 180° C., at which temperature water began to be eliminated. The temperature at the top of the reflux column was maintained between 110–120° C. so that any p-anisidine volatilizing was recondensed and returned to the kettle while the water formed passed over as steam and was condensed in the take-off condenser. The temperature of the reaction mass was maintained between 180–185° C. until 13 parts of water had been recovered. This took approximately 2 to 3 hrs. When 13 parts of water had been recovered, the temperature of the reaction mass was gradually raised to 200–205° C. This increase in reaction temperature was carried out over a period of approximately 1 to 2 hrs. and the increase in reaction temperature was so regulated as to maintain a nearly constant rate of evolution of water. When a total of 17.5 to 18 parts of water had been obtained, the p-methoxy-p'-(OH) diphenylamine was separated from the by-product N-N'-di-p-anisyl-p-phenylene diamine by extraction with sodium hydroxide solution and precipitation with acid. The yield of P-methoxy-p'-(OH)-diphenylamine is approximately 63 to 68% of theory.

Example VII 123 parts of p-anisidine were charged into a pot equipped with an agitator, reflux column and take-off condenser as in Example I. The p-anisidine was heated to 100° C. and 110 parts of hydroquinone and 5.3 parts of ZnCl₂ was added. The pot was then closed and the pressure reduced to 12 cm. The charge was heated under reduced pressure to 170° C., at which temperature water began to be evolved. When the condensation was carried out under this reduced pressure, it was found possible to recover the 17.5 to 18 parts of water without raising the temperature of the reaction to more than 170–175° C. Under these conditions, less of the di-p-anisyl-p-phenylene diamine was formed and a higher yield of the desired p-methoxy-p'-(OH) diphenylamine was obtained. At the conclusion of the reaction, the product was worked up as in the preceding example. The yield of p-methoxy-p'-(OH) diphenylamine was about 72% of theory.

In addition to the cases cited in the above examples, this process has been used in preparing many other similar types of compounds. The process is applicable to the preparation of other compounds employing other starting materials. For example, compounds may be prepared from other alkoxy anilines such as p-butoxy aniline, p-propoxy aniline, p-isopropoxy aniline, and the corresponding meta and ortho isomers, as well as the higher homologues. Other aromatic amines which may be employed in our process are the xylidines, m-anisidine, m-toluidine, m-phenetidine, o-anisidine, o-phenetidine, o-chlor-aniline, p-chlor aniline, o-phenoxy aniline, alpha amino pyridine, dehydrothio-p-toluidine, 2:5-diethoxy aniline, amino acenaphthenes, m-toluylene diamine, the naphthylamines, such as alpha and beta naphthylamines, and their substitution products, and the hydrogenated naphthylamines, such as for example, aryl tetra hydro-b-naphthylamine. The hydroxy substituted diphenylamines may be prepared by reacting one mole of an aromatic amine, such as has been given above, with one mole of a dihydroxy substituted aromatic hydrocarbon of the benzene series, such as for example, hydroquinone, catechol, resorcinol, orcinol, other dihydroxy toluenes, dihydroxy xylenes, and their higher homologues. To produce the amino substituted diphenylamines, two moles of the aromatic amine may be condensed with one mole of the hydroxy compound.

Other catalytic chlorides, which may be employed in certain instances in place of those specifically disclosed in the examples, are the chlorides of cobalt, nickel, cadmium, magnesium, mercury, gallium, indium and thallium.

While we have disclosed the preferred embodiments of our invention and the preferred modes of carrying the same into effect, it will be readily apparent to those skilled in the art that many variations and modifications may be made therein, particularly in the starting materials, without departing from the spirit of our invention. Accordingly, our invention is to be limited solely by the appended claims, construed as broadly as is permissible in view of the prior art.

We claim:

1. In a process of preparing hydroxy and amino substituted N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series, and condensing them in the presence of a small amount, about 0.5% to about 3.5% based on the total amount of amine and hydroxy compound, of zinc chloride, and in the absence of an aqueous solvent at temperatures of about 170 to about 280° C.

2. In a process of preparing hydroxy and amino substituted N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series, and condensing them in the presence of a small amount, about 0.5% to about 3.5% based on the total amount of amine and hydroxy compound, of zinc chloride, and in the absence of an aqueous solvent at temperatures of about 170 to about 280° C., removing water as it is formed.

3. In a process of preparing hydroxy and amino substituted N-phenyl-arylamines, the steps which comprise mixing substantially theoretical proportions of a dihydroxy benzene and a primary aromatic amine in which the aromatic nucleus is a member of the group consisting of aromatic radicals of the benzene and naphthalene series, and condensing them in the presence of a small amount, about 0.5% to about 3.5% based on the total amount of amine and hydroxy compound, of zinc chloride, and in the absence of an aqueous solvent at temperatures of about 170 to about 280° C.

4. In a process of preparing hydroxy and amino substituted N-phenyl-diarylamines, the steps which comprise mixing substantially theoretical proportions of hydroquinone and a primary aromatic amine in which the aromatic nucleus is a member of the group consisting of aromatic radicals of the benzene and naphthalene series, and condensing them in the presence of a small amount, about 0.5% to about 3.5% based on the total amount of amine and hydroxy compound, of zinc chloride, and in the absence of an aqueous solvent at temperatures of about 170 to about 280° C.

5. In a process of preparing hydroxy and amino substituted diphenylamines, the steps which comprise mixing substantially theoretical proportions of a dihydroxy substituted hydrocarbon of the benzene series and a primary aromatic amine of the benzene series, and condensing them in the presence of a small amount, about 0.5% to about 3.5% based on the total amount of amine and hydroxy compound, of zinc chloride, and in the absence of an aqueous solvent at temperatures of about 170 to about 280° C.

6. In a process of preparing hydroxy and amino substituted N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series in which substituents are restricted to lower alkyl and lower alkoxy radicals, and condensing them in the presence of a small amount, about 0.5% to about 3.5% based on the total amount of amine and hydroxy compound, of zinc chloride, and in the absence of an aqueous solvent at temperatures of about 170 to about 280° C.

7. In a process of preparing hydroxy and amino substituted diphenylamines, the steps which comprise mixing substantially theoretical proportions of a dihydroxy benzene and a primary aromatic amine of the benzene series in which substituents are restricted to lower alkyl and lower alkoxy radicals, and condensing them in the presence of a small amount, about 0.5% to about 3.5% based on the total amount of amine and hydroxy compound, of zinc chloride, and in the absence of an aqueous solvent at temperatures of about 170 to about 280° C.

8. In a process of preparing hydroxy and amino substituted secondary N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series in which substituents are restricted to lower alkyl and lower alkoxy radicals, and condensing them in the presence of a small amount, about 0.5% to about 3.5% based on the total amount of amine and hydroxy compound, of zinc chloride, and in the absence of an aqueous solvent at temperatures of about 170 to about 280° C., removing water as it is formed.

9. In a process of preparing hydroxy and amino substituted diphenylamines, the steps which comprise mixing substantially theoretical proportions of a dihydroxy benzene and a primary aromatic amine of the benzene series in which substituents are restricted to lower alkyl and lower alkoxy radicals, and condensing them in the presence of a small amount, about 0.5% to about 3.5% based on the total amount of amine and hydroxy compound, of zinc chloride, and in the absence of an aqueous solvent at temperatures of about 170 to about 280° C., removing water as it is formed.

10. In a process of preparing hydroxy and amino substituted secondary N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series, and condensing them under reduced pressure in the presence of a small amount, about 0.5% to about 3.5% based on the total amount of amine and hydroxy compound, of zinc chloride, and in the absence of an aqueous solvent at temperatures of about 170 to about 280° C.

11. In a process of preparing hydroxy and amino substituted secondary N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series in which substituents are restricted to lower alkyl and loyer alkoxy radicals, and condensing them under reduced pressure in the presence of a small amount, about 0.5% to about 3.5% based on the total amount of amine and hydroxy compound, of zinc chloride, and in the absence of an aqueous solvent at temperatures of about 170 to about 280° C.

12. In a process of preparing hydroxy and amino substituted diphenylamines, the steps which comprise mixing substantially theoretical proportions of a dihydroxy benzene and a primary aromatic amine of the benzene series in which substituents are restricted to lower alkyl and lower alkoxy radicals, and condensing them under reduced pressure in the presence of a small amount, about 0.5% to about 3.5% based on the total amount of amine and hydroxy compound, of zinc chloride, and in the absence of an aqueous solvent at temperatures of about 170 to about 280° C.

13. In a process of preparing hydroxy and amino substituted secondary N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series, and condensing them under reduced pressure in the presence of a small amount, about 0.5% to about 3.5% based on the total amount of amine and hydroxy compound, of zinc chloride, and in the absence of an aqueous solvent at temperatures of about 170 to about 280° C., removing water as it is formed and returning other volatilized ingredients to the reacting mixture.

14. In a process of preparing hydroxy and amino substituted secondary N-phenyl-arylamines, the steps which comprise mixing substantially theoretical proportions of a dihydroxy substituted hydrocarbon of the benzene series and a primary aromatic amine in which the aromatic nucleus is a member of the group consisting of aromatic radicals of the benzene and naphthalene series in which substituents are restricted to lower alkyl and lower alkoxy radicals, and condensing them under reduced pressure in the presence of a small amount, about 0.5% to about 3.5% based on the total amount of amine and hydroxy compound, of zinc chloride, and in the absence of an aqueous solvent at temperatures of about 170 to about 280° C., removing water as it is formed and returning other volatilized ingredients to the reacting mixture.

15. In a process of preparing hydroxy and amino substituted diphenylamines, the steps which comprise mixing substantially theoretical proportions of a dihydroxy benzene and a primary aromatic amine of the benzene series in which substituents are restricted to lower alkyl and lower alkoxy radicals, and condensing them under reduced pressure in the presence of a small amount, about 0.5% to about 3.5% based on the total amount of amine and hydroxy compound, of zinc chloride, and in the absence of an aqueous solvent at temperatures of about 170 to about 280° C., removing water as it is formed and returning other volatilized ingredients to the reacting mixture.

16. In the process of preparing para-methoxy-para'-hydroxy diphenylamine, the steps which comprise mixing substantially theoretical proportions of hydroquinone and para-anisidine and condensing them in the presence of a small amount, about 0.5% to about 3.5% based on the total amount of hydroquinone and para-anisidine, of, zinc chloride and in the absence of an aqueous solvent at temperatures of about 170 to about 280° C., removing water as it is formed.

17. In the process of preparing para-methoxy-para'-hydroxy diphenylamine, the steps which comprise mixing substantially theoretical proportions of hydroquinone and para-anisidine and condensing them under reduced pressure in the presence of a small amount, about 0.5% to about 3.5% based on the total amount of hydroquinone and para-anisidine, of zinc chloride, and in the absence of an aqueous solvent at temperatures of about 170 to about 175° C., removing water as it is formed.

18. In the process of preparing para-ethyl-mercapto - para' - hydroxy - diphenylamine, the steps which comprise mixing substantially theoretical proportions of hydroquinone and para-thio-phenetidine and condensing them in the presence of a small amount, about 0.5% to about 3.5% based on the total amount of hydroquinone and para-thio-phenetidine, of zinc chloride, and in the absence of an aqueous solvent at temperatures of about 170 to about 280° C., removing water as it is formed.

ARTHUR M. NEAL.
GEORGE C. STROUSE.